United States Patent
Stowe et al.

(10) Patent No.: US 6,445,855 B1
(45) Date of Patent: Sep. 3, 2002

(54) METHOD OF FABRICATING FUSED AND TAPERED COUPLERS FROM OPTICAL FIBERS HAVING PHOTOSENSITIVE CLADDING REGIONS

(75) Inventors: David W. Stowe, Milford; Margaret Manty, Whitinsville; Stavros Dariotis, Attleboro; Colm V. Cryan, Arlington, all of MA (US)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 09/573,976

(22) Filed: May 19, 2000

Related U.S. Application Data

(60) Provisional application No. 60/135,719, filed on May 25, 1999.

(51) Int. Cl.[7] ............... G02B 6/32; G02B 6/34; G02B 6/26; G02B 6/42; G02B 6/02
(52) U.S. Cl. ............... 385/43; 385/37; 385/126
(58) Field of Search ............... 385/37, 42, 43, 385/48, 126, 127

(56) References Cited

U.S. PATENT DOCUMENTS

| | | | | |
|---|---|---|---|---|
| 5,408,554 A | * | 4/1995 | Cryan et al. | 385/43 |
| 5,473,714 A | * | 12/1995 | Vengsarkar | 385/43 |
| 5,550,940 A | * | 8/1996 | Vengarkar et al. | 385/37 |
| 5,764,831 A | | 6/1998 | Lauzon | 385/43 |
| 5,805,751 A | | 9/1998 | Kewitsch et al. | 385/43 |
| 6,011,881 A | * | 1/2000 | Moslehi | 385/10 |
| 6,289,699 B1 | * | 9/2001 | Kewitsch et al. | 385/37 |
| 6,301,408 B1 | * | 10/2001 | Espindola et al. | 385/37 |
| 6,363,190 B1 | * | 3/2002 | Chen | 385/43 |

\* cited by examiner

*Primary Examiner*—Georgia Epps
*Assistant Examiner*—Alicia M Harrington
(74) *Attorney, Agent, or Firm*—Weingarten, Schurgin, Gagnebin & Lebovici LLP

(57) ABSTRACT

The present invention is a fused/taper fiber optic coupler and related methodologies for a fuse/taper fiber optic coupler with an FBG that does not excite cladding modes and maintains the coupling regions of the fibers in the proper relationship to one another without a complex and expensive process. Aspects of the fused/taper fiber optic coupler include the use of optical fibers with a three layer structure. The optical fibers include a photosensitive core layer, a photosensitive inner cladding layer, and a photo-insensitive outer cladding layer. Coupling regions are formed in each optical fiber by removing the outer cladding layer and the coupling regions in each optical fiber are then helically intertwined. The intertwined coupling regions are then heated and drawn forming a tapered area in which an FBG may be written.

20 Claims, 2 Drawing Sheets

METHOD OF FABRICATING FUSED AND TAPERED COUPLERS FROM OPTICAL FIBERS HAVING PHOTOSENSITIVE CLADDING REGIONS

CROSS REFERENCE TO RELATED APPLICATIONS

Priority is claimed under 35 USC §119(e) of the U.S. Provisional Application No. 60/135,719, filed May 25, 1999.

STATEMENT REGARDING FEDERALLY SPONSORED RESEARCH OR DEVELOPMENT

N/A

BACKGROUND OF THE INVENTION

The present invention relates generally to fiber optic couplers and in particular to fused/tapered couplers made from optical fibers with photosensitive cladding regions.

Fiber optic couplers have many uses, such as multiplexers, optical filters, and add/drop couplers. These couplers have one or more input optical fibers, and one or more output optical fibers depending on the configuration and function of the coupler.

A typical optical fiber used in these couplers consists of a core region coaxially surrounded by a cladding layer. The core region is usually some form of $SiO_2$ and may be doped with known dopant elements to render the core photosensitive. A photosensitive core may be used as a fiber amplifier, an optically pumped laser, or to have a fiber Bragg grating written within the fiber by a UV laser or other source. Optical power (light) is propagated through the core of the fiber by total internal reflection, where the index of refraction of the core is larger than the index of refraction of the cladding. The cladding, in general, is not photosensitive. A core may be either a multi-mode core, allowing many different modes of propagation through the optical fiber, or a single mode core, allowing a single mode of propagation through the optical fiber.

Although optical fibers provide greater bandwidth and less attenuation than electrically conductive wires, a signal is not propagated without loss or distortion. Typical losses in a fiber may include attenuation and distortion caused by dispersion of the signal within the core is also a factor. In some cases the attenuation of the signal is increased by optical power that has been coupled to the cladding and stays within the cladding and does not return to the core. This is referred as a cladding mode of propagation and may be excited light entering the cladding.

One example of a fiber optic coupler is an add/drop multiplexer (ADM). An ADM typically has an input fiber, an output fiber, a drop fiber, an add fiber, and a coupling region or junction. Within the coupling region, one of more fibers may have a grating made within them. The grating is a plurality of grating elements, equidistant from one another, where each grating element reflects a small portion of the light propagating through the core. The light that is reflected is narrowly centered about a central or resonant wavelength, and the cumulative effect of the plurality of gratings is to reflect the resonant wavelength into the drop fiber and remove it from the optical energy propagating within the core. These grating elements are typically referred to as fiber Bragg gratings (FBG).

The coupling region substantially couples all of the optical power from the input optical fiber into the output optical fiber, and the fiber grating will reflect the resonant frequency of the FBG into the "drop" fiber. Thus, the coupling region of an ADM is the area in which optical power is coupled between two or more fibers. These coupled fibers are placed proximal to one another so that optical communication and coupling between the fibers occurs. Coupling between the cores of each optical fiber and therefore a portion of the cladding must be removed or thinned to allow the optical coupling between the cores. The removal or thinning of the cladding is usually achieved by one of two methods: the first method is the use of a polished coupler and the second method is the use of a fused/taper coupler.

A polished coupler is one in which each of the two optical fibers is side-polished to remove a portion of the cladding. A FBG may be written on one of the optical fibers as an optical filter. The two fibers are then cemented together with an index matching material so that the side-polished portion of one fiber is held adjacent to, proximal to, and optically aligned with the side-polished portion of the other optical fiber.

Polished couplers suffer from several disadvantages however. The polishing of the fibers is a difficult technique to implement and the devices themselves are difficult to fabricate due to the small sizes of the polished regions. The small sizes make the alignment and adjustment of the coupler difficult. Also, the polished regions must be maintained in a parallel relationship to one another, over the coupler length, to avoid coupling problems. In addition, because of the fine alignment requirements and the need to maintain the polished regions parallel to one another, the coupling regions need to be held in a very stable manner. However, because each fiber will have a different composition from the other however slight, and the index matching cement is an entirely different material as well, a polished coupler is not environmentally stable. As each material expands and contracts at slightly different rates, the alignment of the fibers, the coupling efficiency, and the resonant frequency of any FBG written on a fiber will be changing. Finally, because only a portion of the cladding is removed or thinned, optical power will couple to the cladding within the coupling region and also that which borders on the polished region from the core. This will result in the excitation of cladding modes and an increase in insertion loss as discussed above.

A fused/taper coupler is one in which two or more optical fibers are wrapped together and heated. The two or more optical fibers are heated sufficiently to allow them to be drawn to form a central unified mass so that light on any input fiber is coupled through a thin cladding to the output fibers. The area that is heated and drawn is known as the "waist" or "taper" area because of the narrowed diameter when compared to the input and output fiber diameters. If at least one photosensitive fiber is used, then an FGB may be written on that optical fiber to act as an optical filter.

Fused/taper couplers suffer from several disadvantages however. By tapering the fiber, the optical power is driven from the core into the cladding. This occurs because the optical power is substantially carried within approximately three core diameters of the center of the core. Thus as optical power is driven into the core, cladding modes may be excited and optical power lost, increasing the insertion loss of the coupler. In addition, it is difficult to fabricate an ADM from a photosensitive optical fiber. It is thought that the small differences in the index of refraction between the photosensitive and photo-insensitive claddings is the cause of these problems.

What is needed in the art therefore is an ADM in which the excitation of cladding modes is reduced and in which the manufacture techniques are not as difficult as in the prior art.

BRIEF SUMMARY OF THE INVENTION

The present invention provides a fused/taper fiber optic coupler that reduces the excitation of cladding modes and which is easier to produce than the prior art. A fused/taper fiber optic coupler comprises first and second optical fibers, each of the first and second optical fibers including a core section, an inner cladding layer coaxially disposed around the core section, and a outer cladding layer coaxially disposed around the inner cladding layer. The core section has a first index of refraction and the inner cladding layer has a second index of refraction that is less than the first index of refraction. The outer cladding also has an index of refraction that is substantially equal to the second index of refraction. First and second coupling regions are formed in the first and second optical fibers respectively, and each of the first and second coupling regions have the outer cladding layer circumferentially removed from the first and second optical fibers respectively. The first coupling region has a first length and the second coupling region has a second length. A tapered coupling junction formed from the first and second coupling regions helically intertwined together with a first helical pitch and length, wherein the first and second coupling regions are maintained substantially parallel and proximal to one another for optical coupling therebetween. A fiber Bragg grating is formed in the tapered coupling junction.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

The present invention is a fused/taper fiber optic coupler and related methodologies for a fused/taper fiber optic coupler with an FBG that does not excite cladding modes and maintains the coupling regions of the fibers in the proper relationship to one another without a complex and expensive process. As will be explained in greater detail below, disclosed aspects of the fused/taper fiber optic coupler include the use of optical fibers with a three layer structure. The optical fibers include a photosensitive core layer, a photosensitive inner cladding layer, and a photo-insensitive outer cladding layer. Coupling regions are formed in each optical fiber by circumferentially removing the outer cladding layer, and the coupling regions in each optical fiber are then helically intertwined to maintain the desired spatial relationship. The intertwined coupling regions are then heated and drawn forming a tapered area in which an FBG may be written.

Figure 5:
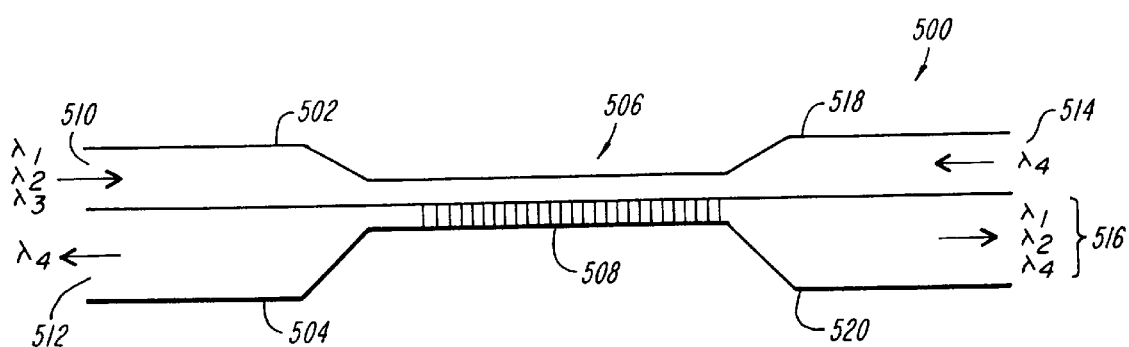
FIG. 5 is a side view of a fused/tapered fiber optic add/drop multiplexer.

FIG. 5 illustrates a fused/taper add/drop multiplexer (ADM). Two optical fibers 502 and 504 are heated sufficiently to be fused together and drawn to form a waist region 506. A fiber Bragg grating (FBG) 508 is written on at least one of the two fibers that acts to reflect a selected wavelength $\lambda$. The input fiber end 510 may include a plurality of light wavelengths shown as $\lambda_1$, $\lambda_2$, and $\lambda_3$. The drop fiber end 512 is the end of the fiber where the wavelength selected by the FBG 508 exits the fiber. Add fiber end 514 is able to introduce another wavelength, $\lambda_4$, into the output fiber 520.

Figure 1:
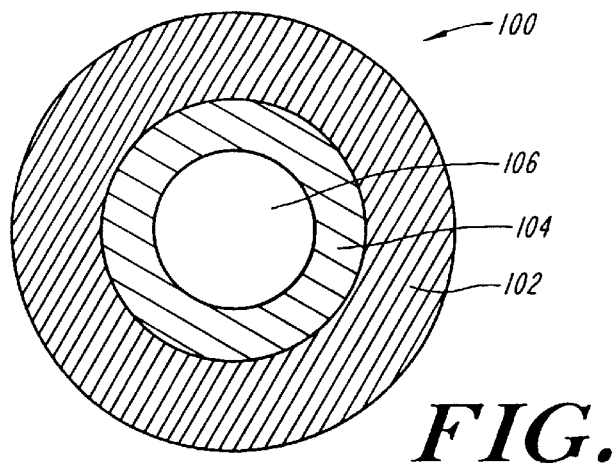
FIG. 1 is a transverse cross section of an optical fiber suitable for use with the present invention.

FIG. 1 illustrates a cross-section of a fiber suitable for use within a fiber/taper coupler described herein. Optical fiber 100 includes an inner core 106 that is coaxially surrounded by an inner cladding layer 104 that is coaxially surrounded by an outer cladding layer 102. Inner core 106 is typically $SiO_2$ and is sized to be single-mode fiber. In addition, the core 106 may be doped with a dopant such as $GeO_2$ in order to render the core photosensitive. As will be explained in more detail below, the consistency of the index of refraction of the cladding is very important. The core 106 has a first index of refraction that is dependent upon the material used to make the core and any dopants used to make the core photosensitive.

Inner cladding layer 104 is a photosensitive layer and has a second index of refraction that is less than the first index of refraction of the core 106 to ensure that total internal reflection will take place and the optical power will propagate through the core. In addition, the inner cladding layer 104 preferably is approximately at least 2 core diameters wide so that the majority of the optical power is propagated through photosensitive materials. Inner cladding layer 104 is doped with $GeO_2$ to render it photosensitive. It is known that doping with $GeO_2$ raises the index of refraction of the material, thus, in one embodiment Boron is added to the cladding to reduce the index of refraction of the cladding. As will be explained in greater detail below, the photosensitive cladding helps to prevent the excitation of cladding modes in the coupler. Outer cladding layer 102 is substantially photo-insensitive and has an index of refraction substantially equal to the second index of refraction of the inner cladding layer 104. Typically, the inner and outer cladding layers are step-index cladding layers.

Figure 2:
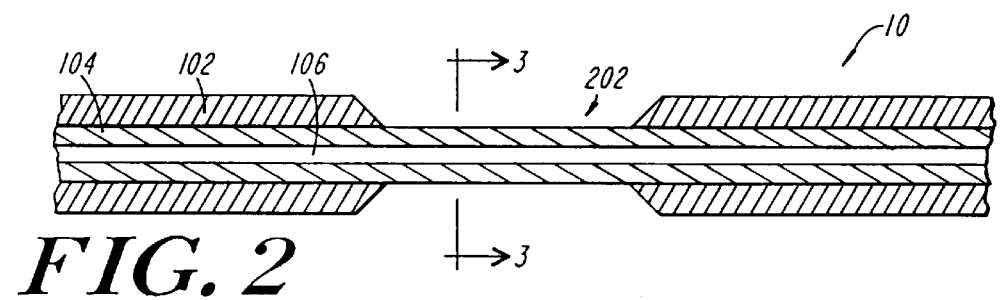
FIG. 2 is a longitudinal cross section of an optical fiber having a coupling region formed thereon suitable for use with the present invention.
Figure 3:
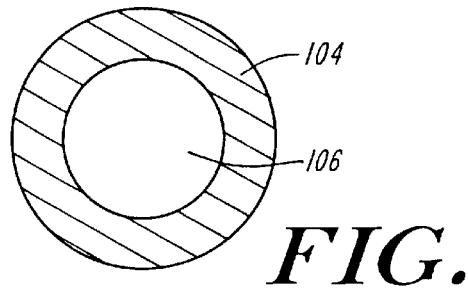
FIG. 3 is a longitudinal cross section view along line 3—3 of FIG. 2.

FIGS. 2 and 3 illustrate an optical fiber that has been prepared for use in a fused/taper coupler described herein. An optical fiber 100 has had a coupling region 202 formed by the circumferential removal of the outer cladding layer 102. According to the present invention, the outer cladding layer 102 is substantially removed from the entire region 202 so that the outer cladding layer no longer coaxially surrounds the inner cladding layer 104 within region 202. Any suitable method may be used to remove the outer cladding layer 102, and in one preferred embodiment, a wet etching process is used. In one embodiment, the length of the coupling region 202 is between 25 and 40 millimeters, with a preferred length of 30 millimeters.

The etching process is a wet process in which the optical fibers are placed in a HF solution, which in one embodiment may be buffered with ammonium biflouride. The optical fibers are placed in the solution in order to dissolve the outer regions of glass. In one embodiment, the etching solution may be heated to accelerate the etching process. As is known, the speed of the etching process is a function of many variables such as the age of the etching solution and the conditions under which it was stored. Some experimentation, therefore, is necessary to determine the rate of the etching and period of time necessary to achieve not only the desired amount of glass dissolved but also to achieve the necessary surface quality as well.

It is important that substantially all of the outer cladding be removed within the coupling region 202. This ensures that little or no photo-insensitive cladding is present within the coupling region 202. In one embodiment, the outer cladding layer is etched down to the nominal interface between the outer and inner cladding layers. In another embodiment, the entire outer cladding is removed and a part of the inner cladding is removed as well. In another embodiment, the outer cladding layer is not etched down to the nominal interface and a small layer of the outer cladding remains.

As discussed above, the majority of optical power is propagated within 3 core diameters of the center of the optical fiber. When a fused/taper coupler or ADM is heated and drawn to form the tapered region, more optical power is driven into the cladding layer of the optical fiber and is therefore available for coupling with the other optical fiber. However, with optical power forced into the cladding, cladding modes are excited. By removing substantially all of the outer cladding layer the optical power is prevented from entering the photo-insensitive cladding and therefore, the excitation of cladding modes is greatly reduced or eliminated.

Figure 4:
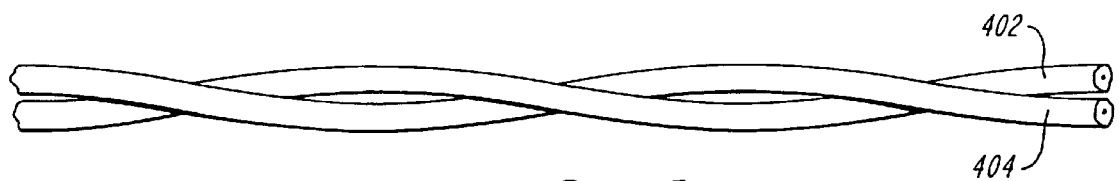
FIG. 4 is an isometric view of the tapered coupling junction consistent with the present invention.

After the two optical fibers are prepared as discussed above, the fused/taper coupler is made by maintaining the coupling regions of the two optical fibers in a substantially parallel relationship that is sufficiently proximal to allow optical coupling between the two optical fibers. In one embodiment, the fibers are placed parallel to one another and held straight in preparation to be heated and drawn. In one preferred embodiment, this parallel relationship is achieved and maintained by helically intertwining the two coupling regions in each of the two optical fibers as shown in FIG. 4. The pitch and the location of the helical twist of the fibers are arranged such that they are substantially parallel through the center of the coupler region where the FBG is to be written. The fibers should be maintained in a parallel relationship for a length of between 15 and 30 millimeters with a preferred length of 20 millimeters. The pitch of helical twist should be at least ½ revolution per centimeter and in one embodiment may be as high as 2 revolutions per cenitmeter. In a preferred embodiment, there is a first pitch which is tripled through the middle of the coupling region.

In one preferred embodiment, after intertwining the two optical fibers, the intertwined coupling region is then heated and drawn to form the fused and tapered portion of the coupler as is well known in the art. In one preferred embodiment, the middle ½ centimeter of the coupling region is drawn between 5 and 20 times the original length, with the pitch within this region being reduced by a similar amount. In this embodiment, the coupling region would expand from approximately 2 cm to between 6.5 and 12 cm. In one embodiment, the fibers are held straight and parallel to one another and are heated and drawn together.

After heating and drawing the intertwined coupling area, a FBG can be written into the tapered intertwined coupling region using UV light and techniques that are well known in the art such as using phase masks, interference holograms, or interfering laser beams. It is important that the FBG not be written prior to the heating and drawing stage because the heat required for the drawing process would damage or erase the FBG and the tapering process would alter the periodic structure of the FBG as well.

Because the outer cladding layer has been removed, the area that is photosensitive is increased, the FBG writing procedure is enhanced and simplified, and the presence of cladding modes is reduced when compared to traditional fused/taper couplers.

In one embodiment, the optical fibers in the fuse/taper coupler can be selected to have substantially similar propagation constants to form a symmetric coupler. This will allow a coupling ratio to be approximately 100%.

In another embodiment, the optical fibers in the fuse/taper coupler can be selected to have substantially dissimilar propagation constants to form an asymmetric or null coupler. This will allow a coupling ratio to be approximately 0% in the absence of a FBG.

In another embodiment, the coupler can be constructed using three or more optical fibers Those of ordinary skill in the art should further appreciate that variations to and modifications of the above-described fused/taper fiber optic coupler and the methods of producing it may be made without departing from the inventive concept disclosed herein. Accordingly, the invention should be viewed as limited solely by the scope and spirit of the appended claims.

What is claimed is:

1. A fused/taper fiber optic coupler comprising:
   first and second optical fibers, each of the first and second optical fibers including a core section, an inner cladding layer coaxially disposed around the core section, and an outer cladding layer coaxially disposed around the inner cladding layer;
   the core section having a first index of refraction;
   the inner photosensitive cladding layer having a second index of refraction less than the first index of refraction and the outer cladding having an index of refraction substantially equal to the second index of refraction;
   first and second coupling regions in the first and second optical fibers respectively, within which the outer cladding layer has been circumferentially removed from the first and second optical fibers respectively, the first and second coupling regions having substantially the same length;
   a tapered coupling junction formed from the first and second coupling regions, wherein the first and second coupling regions are maintained substantially parallel and proximal to one another for optical coupling therebetween;
   a fiber Bragg grating disposed within the tapered coupling junction.

2. The fused/taper coupler of claim 1 wherein the first and second lengths of the first and second coupling regions respectively are between 25 and 40 millimeters.

3. The fused/taper coupler of claim 2 wherein the first and second lengths of the first and second coupling regions respectively are 30 millimeters.

4. The fused/taper coupler of claim 1 wherein the length of the tapered coupling junction is between 15 and 30 millimeters.

5. The fused/taper coupler of claim 4 wherein the length of the tapered coupling junction is 20 millimeters.

6. The fused/taper coupler of claim 1 wherein the first and second optical fibers have substantially similar propagation constants.

7. The fused/taper coupler of claim 1 wherein the first and second optical fibers have substantially dissimilar propagation constants.

8. The fused/taper coupler of claim 1 wherein the first and second coupling regions are he lically intertwined together for maintaining the first and second coupling regions substantially parallel and proximal to one another for optical coupling therebetween.

9. The fused/taper coupler of claim 8 wherein the helical pitch is between ½ and 2.

10. The fused/taper coupler of claim 9 wherein the helical pitch is 1.

11. The fused/taper coupler of claim 1 further including a third optical fiber including a core section, an inner cladding layer coaxially disposed around the core section, and an outer cladding layer coaxially disposed around the inner cladding layer;

the core section having a first index of refraction;

the inner cladding layer having a second index of refraction less than the first index of refraction and the outer cladding having an index of-refraction substantially equal to the second index of refraction;

a third coupling region in the third optical fibers respectively, having the outer cladding layer circumferentially removed from the third optical, the third coupling region having a third length;

the tapered coupling junction further including the third coupling region being helically intertwined together with the first and second coupling regions, the intertwining being with a first helical pitch and length, wherein the first and second coupling regions are maintained substantially parallel and proximal to one another for optical coupling therebetween.

12. A method for producing a fused/taper fiber optic coupler comprising the steps of:

providing at least two optical fibers each optical fiber having a core section, an inner cladding layer coaxially disposed around the core section, and a outer cladding layer coaxially disposed around the inner cladding layer;

circumferentially removing the outer cladding layer of the at least two optical fibers within a coupling region;

maintaining the coupling regions of the at least two optical fibers parallel to one another;

heating and drawing the coupling junction to form a tapered coupling junction;

writing a fiber Bragg grating on the tapered coupling junction.

13. The method as in claim 12 wherein the step of removing the outer cladding layer includes wet etching the at least first and second optical fibers within the coupling region.

14. The method as in claim 12 wherein the step of maintaining includes helically intertwining the coupling regions of the at least two optical fibers with a first helical pitch and length forming a coupling junction.

15. The method as in claim 14 wherein the step of helically intertwining the coupling regions uses a helical pitch between ½ and 2.

16. The method as in claim 14 wherein the step of helically intertwining the coupling regions uses a length between 1 and 2 centimeters.

17. The method as in claim 12 wherein step of writing a fiber Bragg grating uses UV light.

18. The method as in claim 12 wherein step of writing a fiber Bragg grating uses a phase mask.

19. The method as in claim 12 wherein step of writing a fiber Bragg grating uses interference holograms.

20. The method as in claim 12 wherein step of writing a fiber Bragg grating uses interfering laser beams.

* * * * *